US011768920B2

(12) United States Patent
Kim

(10) Patent No.: US 11,768,920 B2
(45) Date of Patent: Sep. 26, 2023

(54) APPARATUS AND METHOD FOR PERFORMING HETEROGENEOUS SENSOR FUSION

(71) Applicants: HYUNDAI MOTOR COMPANY, Seoul (KR); KIA MOTORS CORPORATION, Seoul (KR)

(72) Inventor: Seong Hwan Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 108 days.

(21) Appl. No.: 17/094,499

(22) Filed: Nov. 10, 2020

(65) Prior Publication Data

US 2022/0019862 A1  Jan. 20, 2022

(30) Foreign Application Priority Data

Jul. 20, 2020 (KR) .................. 10-2020-0089670

(51) Int. Cl.
*G06V 10/80* (2022.01)
*G06F 18/25* (2023.01)
*G06V 20/56* (2022.01)
*G06F 18/22* (2023.01)

(52) U.S. Cl.
CPC ............ *G06F 18/251* (2023.01); *G06F 18/22* (2023.01); *G06V 20/588* (2022.01)

(58) Field of Classification Search
CPC .. G06K 9/6289; G06K 9/6215; G06V 20/588; G06V 2201/08; G06V 10/803; G01S 17/89
See application file for complete search history.

(56) References Cited

U.S. PATENT DOCUMENTS

| 9,729,865 | B1* | 8/2017 | Kuo ...................... G06F 1/1686 |
| 10,108,867 | B1* | 10/2018 | Vallespi-Gonzalez ...................... G06V 20/58 |
| 10,140,855 | B1* | 11/2018 | Swaminathan ......... G01S 13/91 |
| 10,429,839 | B2* | 10/2019 | Liu ........................ B64C 39/024 |
| 10,468,062 | B1* | 11/2019 | Levinson ............... G08G 1/166 |
| 10,859,684 | B1* | 12/2020 | Nabatchian ............... G06T 7/13 |
| 2006/0245617 | A1* | 11/2006 | Shan ...................... G06V 20/56 382/103 |
| 2014/0333722 | A1* | 11/2014 | Kim ........................ G06T 7/73 348/46 |
| 2014/0347475 | A1* | 11/2014 | Divakaran ............. G06V 20/52 348/135 |
| 2017/0083765 | A1* | 3/2017 | Risinger ............... G06V 10/751 |
| 2018/0330175 | A1* | 11/2018 | Corcoran ............. G06V 10/147 |

(Continued)

*Primary Examiner* — Solomon G Bezuayehu
(74) *Attorney, Agent, or Firm* — Slater Matsil, LLP

(57) ABSTRACT

A heterogeneous sensor fusion apparatus includes a point processor configured to detect a first object by processing a detection point input from a first sensor, an image processor configured to detect a second object by processing an image input from a second sensor, a point-matching unit configured to calculate a matching rate by matching the detection point with the image, and to determine whether the first object and the second object are identical based on the calculated matching rate, an association unit configured to generate track information by fusing information from the first sensor and the second sensor when the first object and the second object are identical, and an output unit configured to output the generated track information.

20 Claims, 10 Drawing Sheets

(56) References Cited

U.S. PATENT DOCUMENTS

| | | | |
|---|---|---|---|
| 2019/0294889 A1* | 9/2019 | Sriram | G06F 18/24143 |
| 2020/0218913 A1* | 7/2020 | Unnikrishnan | G01S 13/867 |
| 2021/0019365 A1* | 1/2021 | Mangla | G06V 30/414 |
| 2021/0110168 A1* | 4/2021 | Yang | G06V 20/46 |
| 2021/0224572 A1* | 7/2021 | Navoyan | G06V 20/41 |
| 2022/0019845 A1* | 1/2022 | Zhang | G06V 20/56 |
| 2022/0327737 A1* | 10/2022 | Wilhelm | G06V 20/64 |

* cited by examiner

APPARATUS AND METHOD FOR PERFORMING HETEROGENEOUS SENSOR FUSION

CROSS-REFERENCE TO RELATED APPLICATION

The present application claims the priority to and the benefit of Korean Patent Application No. 10-2020-0089670, filed on Jul. 20, 2020, which is hereby incorporated by reference in its entirety.

TECHNICAL FIELD

The present disclosure relates to a heterogeneous sensor fusion apparatus, and more particularly to an apparatus and method for performing heterogeneous sensor fusion.

BACKGROUND

Recently, with the implementation of an advanced driver assistance system (ADAS), object recognition technologies using various types of sensors have been developed and actively applied.

A track output of various sensors for sensor fusion includes various pieces of information, and in this regard, various new methods for improving the accuracy of output information, such as the position, speed, class, or the like of a track, have been studied and developed.

In general, a Lidar (Radar) sensor has high accuracy for information on the position of a track but has low accuracy for class information of the track due to the characteristics of the sensor.

In contrast, an image sensor has characteristics of relatively low accuracy for information on the position of a track but has high accuracy for class information of the track.

When the output results of individual sensors having these characteristics are fused, it may be frequently difficult to fuse information from sensors due to an error in detection of relative positions thereof.

SUMMARY

Accordingly, the present disclosure is directed to an apparatus and method for performing heterogeneous sensor fusion for improving the performance for fusion of heterogeneous sensors to improve the accuracy of track information by matching a detection point of a first sensor with an object in an image of a second sensor to calculate a matching rate and fusing information from the first and second sensors based on the matching rate.

The technical problems solved by the embodiments are not limited to the above technical problems and other technical problems which are not described herein will become apparent to those skilled in the art from the following description.

To achieve these objects and other advantages and in accordance with the purpose of the invention, as embodied and broadly described herein, a heterogeneous sensor fusion apparatus includes a point processor configured to detect an object by processing a detection point input from a first sensor, an image processor configured to detect an object by processing an image input from a second sensor, a point-matching unit configured to calculate a matching rate by matching the detection point with the object in the image, and to check whether the object in the image and the object corresponding to the detection point are the same object based on the calculated matching rate, an association unit configured to generate track information by fusing information from the first and second sensors when the object in the image and the object corresponding to the detection point are the same object, and an output unit configured to output the generated track information.

In another aspect of the present disclosure, a heterogeneous sensor fusion method of a heterogeneous sensor fusion apparatus configured to fuse information from first and second sensors and including a point processor, an image processor, a point-matching unit, an association unit, and an output unit includes detecting an object by processing a detection point input from the first sensor, by the point processor, detecting an object by processing an image input from the second sensor, by the image processor, calculating a matching rate by matching the detection point with the object in the image, by the point-matching unit, checking whether the object in the image and the object corresponding to the detection point are the same object based on the calculated matching rate, by the point-matching unit, generating track information by fusing information from the first and second sensors when the object in the image and the object corresponding to the detection point are the same object, by the association unit, and outputting the generated track information, by the output unit.

In another aspect of the present disclosure, a computer-readable recording medium having recorded thereon a program for executing the heterogeneous sensor fusion method of the heterogeneous sensor fusion apparatus performs procedures provided by the heterogeneous sensor fusion method of the heterogeneous sensor fusion apparatus.

In another aspect of the present disclosure, a vehicle includes a first sensor configured to acquire a detection point corresponding to an object around the vehicle, a second sensor configured to acquire an image of a region around the vehicle, and a heterogeneous sensor fusion apparatus configured to fuse information from the first and second sensors, wherein the heterogeneous sensor fusion apparatus detects an object by processing a detection point input from the first sensor, detects an object by processing an image input from the second sensor, calculates a matching rate by matching the detection point with the object in the image, checks whether the object in the image and the object corresponding to the detection point are the same object based on the calculated matching rate, generates track information by fusing the information from the first and second sensors when the object in the image and the object corresponding to the detection point are the same object, and outputs the generated track information.

DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
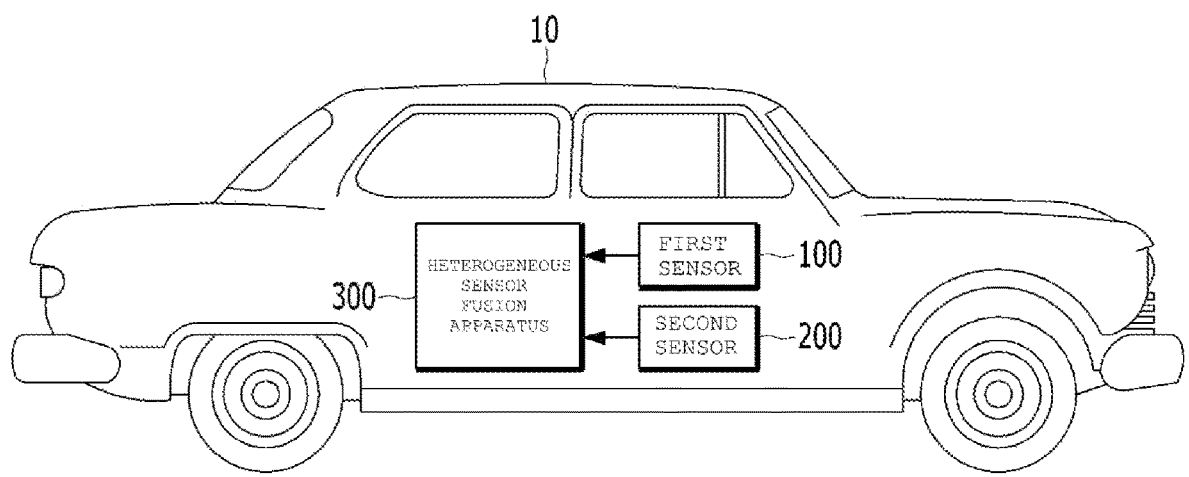
FIG. 1 is a diagram for explaining a vehicle including a heterogeneous sensor fusion apparatus in one form of the present disclosure.

Exemplary embodiments of the present disclosure are described in detail so as for those of ordinary skill in the art to easily implement the present disclosure with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Hereinafter, an apparatus and method for performing heterogeneous sensor fusion to which embodiments of the present disclosure are applicable will be described in detail with reference to FIGS. 1 to 8.

FIG. 1 is a diagram for explaining a vehicle including a heterogeneous sensor fusion apparatus according to an embodiment of the present disclosure.

Referring to FIG. 1, a vehicle 1 may include a first sensor 100 for acquiring a detection point corresponding to an object around the vehicle, a second sensor 200 for acquiring an image of a region around the vehicle, and a heterogeneous sensor fusion apparatus 300 for fusing information from the first and second sensors 100 and 200.

Here, the first and second sensors 100 and 200 may be different heterogeneous sensors.

For example, the first sensor 100 may include at least one of Lidar or Radar, and the second sensor 200 may include a camera, but the present disclosure is not limited thereto.

The heterogeneous sensor fusion apparatus 300 may detect an object by processing a detection point input from the first sensor 100, may detect an object by processing an image input from the second sensor 200, may calculate a matching rate by matching the detection point with an object in the image, may check whether the object in the image and the object corresponding to the detection point are the same object based on the calculated matching rate, may generate track information by fusing information from the first and second sensors 100 and 200 when the object in the image and the object corresponding to the detection point are the same object, and may output the generated the track information.

Here, when receiving the detection point from the first sensor 100, the heterogeneous sensor fusion apparatus 300 may detect and classify an object based on the detection point and may store coordinate information of the detection point included in the detected object.

The heterogeneous sensor fusion apparatus 300 may convert coordinate information of the detection point included in the object into a world coordinate system of an image by projecting the coordinate information of the detection point included in the object onto an image layer.

When receiving an image from the second sensor, the heterogeneous sensor fusion apparatus 300 may detect and classify an object from the image and may store coordinate information of an image pixel included in the detected object.

Then, when calculating the matching rate, the heterogeneous sensor fusion apparatus 300 may generate a first box corresponding to the object at the detection point projected onto the image layer, may generate a second box corresponding to the object in the image, and may calculate the matching rate by comparing the area of any one of the first and second boxes with the area of an overlapping region between the first and second boxes.

Here, the heterogeneous sensor fusion apparatus 300 may calculate the matching rate using the equation "Matching rate=area of overlapping region between first and second boxes/area of any one of first and second boxes".

In another case, when calculating the matching rate, the heterogeneous sensor fusion apparatus 300 may generate the first box corresponding to the object at the detection point projected onto the image layer, may generate the second box corresponding to the object in the image, and may calculate the matching rate based on the number of detection points included in the second box.

Here, the heterogeneous sensor fusion apparatus 300 may also calculate the matching rate using the equation "matching rate=number of detection points included in second box/total number of detection points projected onto image layer".

Then, when checking whether the object in the image and the object corresponding to the detection point are the same object, the heterogeneous sensor fusion apparatus 300 may check whether the calculated matching rate is equal to or greater than a reference ratio, and may recognize that the object in the image and the object corresponding to the detection point are the same object when the matching rate is equal to or greater than the reference ratio.

Here, when checking whether the calculated matching rate is equal to or greater than the reference ratio, the heterogeneous sensor fusion apparatus 300 may recognize that the object in the image and the object corresponding to the detection point are different objects when the matching rate is less than the reference ratio.

The heterogeneous sensor fusion apparatus 300 may fuse information from the first and second sensors to generate track information and may output the generated track information.

As necessary, when recognizing that the object in the image and the object corresponding to the detection point are different objects, the heterogeneous sensor fusion apparatus 300 may separately output information on the first and second sensors without fusing the same.

As such, according to the present disclosure, as a sensor fusion method for improving the performance of fusion of an image sensor and a Lidar sensor (high-performance Radar), which have raw data having similar characteristics, the coordinates of a point cloud may be changed to reference coordinates of the image layer, and the point cloud having the changed coordinates may be compared with a pixel of the image, thereby improving the performance for determining whether detected objects are the same object.

As such, the present disclosure may simply convert data and may improve the performance of sensor fusion using a fusion application method between heterogeneous sensors having raw data with similar characteristics.

The present disclosure may improve the performance of sensor fusion without an additional increase in material costs by implementing logic in software.

Figure 2:
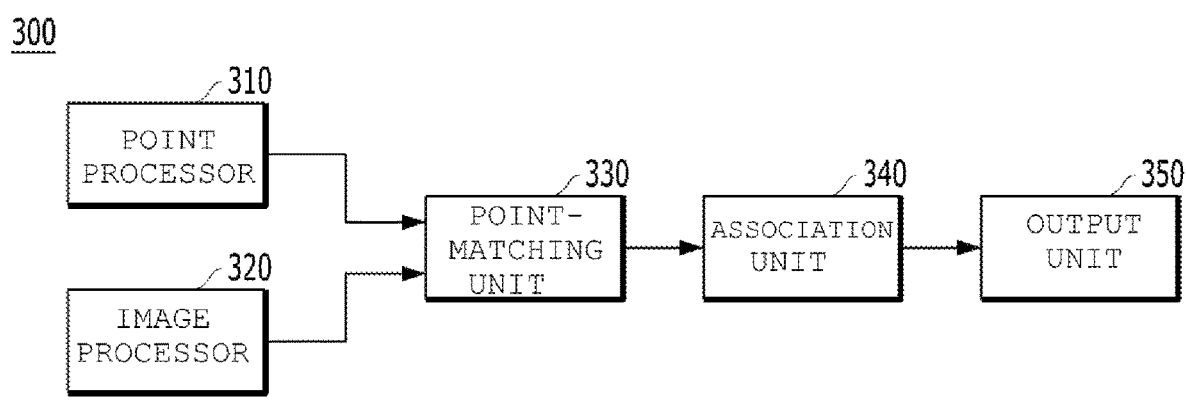
FIG. 2 is a block diagram for explaining a heterogeneous sensor fusion apparatus in one form of the present disclosure.

FIG. 2 is a block diagram for explaining a heterogeneous sensor fusion apparatus according to an embodiment of the present disclosure.

Referring to FIG. 2, the heterogeneous sensor fusion apparatus 300 may include a point processor 310, an image processor 320, a point-matching unit 330, an association unit 340, and an output unit 350.

Here, the point processor 310 may process a detection point input from the first sensor to detect an object.

For example, the point processor 310 may receive the detection point from the first sensor including at least one of Lidar or Radar, but the present disclosure is not limited thereto.

When receiving the detection point from the first sensor, the point processor 310 may detect and classify an object based on the detection point, processed using machine and deep learning, or the like.

The point processor 310 may store coordinate information of the detection point included in the detected object.

Then, the point processor 310 may project the coordinate information of the detection point included in the object onto the image layer and may convert the coordinate information of the detection point included in the object into a world coordinate system of an image.

For example, coordinates of a detection point included in object information of a first sensor including Lidar and Radar may be projected onto the image layer, and the coordinate of the detection point may be converted into a world coordinate system of an image through a TransMatrix that is obtained via calibration between Lidar as the first sensor and a camera as a second sensor or between the Radar as the first sensor and the camera as the second sensor.

Then, the image processor 320 may detect an object by processing an image input from the second sensor.

For example, the image processor 320 may receive an image from the second sensor including a camera, but the present disclosure is not limited thereto.

When receiving an image from the second sensor, the image processor 320 may detect and classify the object based on the image processed using deep learning or the like.

The image processor 320 may store coordinate information of an image pixel included in the detected object.

Then, the point-matching unit 330 may calculate a matching rate by matching the detection point with the object in the image, may check whether the object in the image and the object corresponding to the detection point are the same object based on the calculated matching rate.

Here, when calculating the matching rate, the point-matching unit 330 may generate a first box corresponding to the object at the detection point projected onto the image layer, may generate a second box corresponding to the object in the image, and may calculate the matching rate by comparing the area of any one of the first and second boxes with the area of an overlapping region between the first and second boxes.

That is, the point-matching unit 330 may calculate the matching rate using the equation "Matching rate=area of overlapping region between first and second boxes/area of any one of first and second boxes 510 and 520".

As necessary, when calculating the matching rate, the point-matching unit 330 may generate the first box corresponding to the object at the detection point projected onto the image layer, may generate the second box corresponding to the object in the image, and may calculate the matching rate based on the number of detection points included in the second box.

That is, the point-matching unit 330 may calculate the matching rate using the equation "Matching rate=number of detection points included in second box/total number of detection points projected onto image layer".

Then, when checking whether the object in the image and the object corresponding to the detection point are the same object, the point-matching unit 330 may check whether the calculated matching rate is equal to or greater than a reference ratio, may recognize that the object in the image of the object corresponding to the detection point are the same object when the matching rate is equal to or greater than the reference ratio, and may transmit information from the first and second sensors to the association unit 340 so as to fuse the information from the first and second sensors.

For example, the reference ratio may be about 80% to about 90%, but the present disclosure is not limited thereto.

Here, when checking whether the calculated matching rate is equal to or greater than the reference ratio, the point-matching unit 330 may recognize that the object in the image and the object corresponding to the detection point are different objects when the matching rate is less than the reference ratio, and may separately transmit information from the first and second sensors to the output unit 350.

Then, when the object in the image and the object corresponding to the detection point are the same object, the association unit 340 may generate track information by fusing information on the first and second sensors.

The association unit 340 may fuse track information of heterogeneous sensors having a matching rate equal to or greater than a predetermined ratio.

That is, the association unit 340 may generate the track information by fusing information from each sensor with high accuracy.

As necessary, the association unit 340 may selectively fuse information with high accuracy in consideration of the characteristics of sensors.

For example, a weight may be applied to a Lidar (Radar) sensor in the case of position information, and a weight may be applied to an image sensor in the case of class information, but the present disclosure is not limited thereto.

The output unit 350 may output the track information generated by the association unit 340, and may separately output information from the first and second sensors, when the point-matching unit 330 recognizes that the objects detected by processing the outputs from the first and second sensors are different from each other.

For example, the output unit 350 may output the track information generated by the association unit 340 or may separately output information from sensors, which is not fused, and which has a matching rate less than a predetermined ratio.

Figure 3:
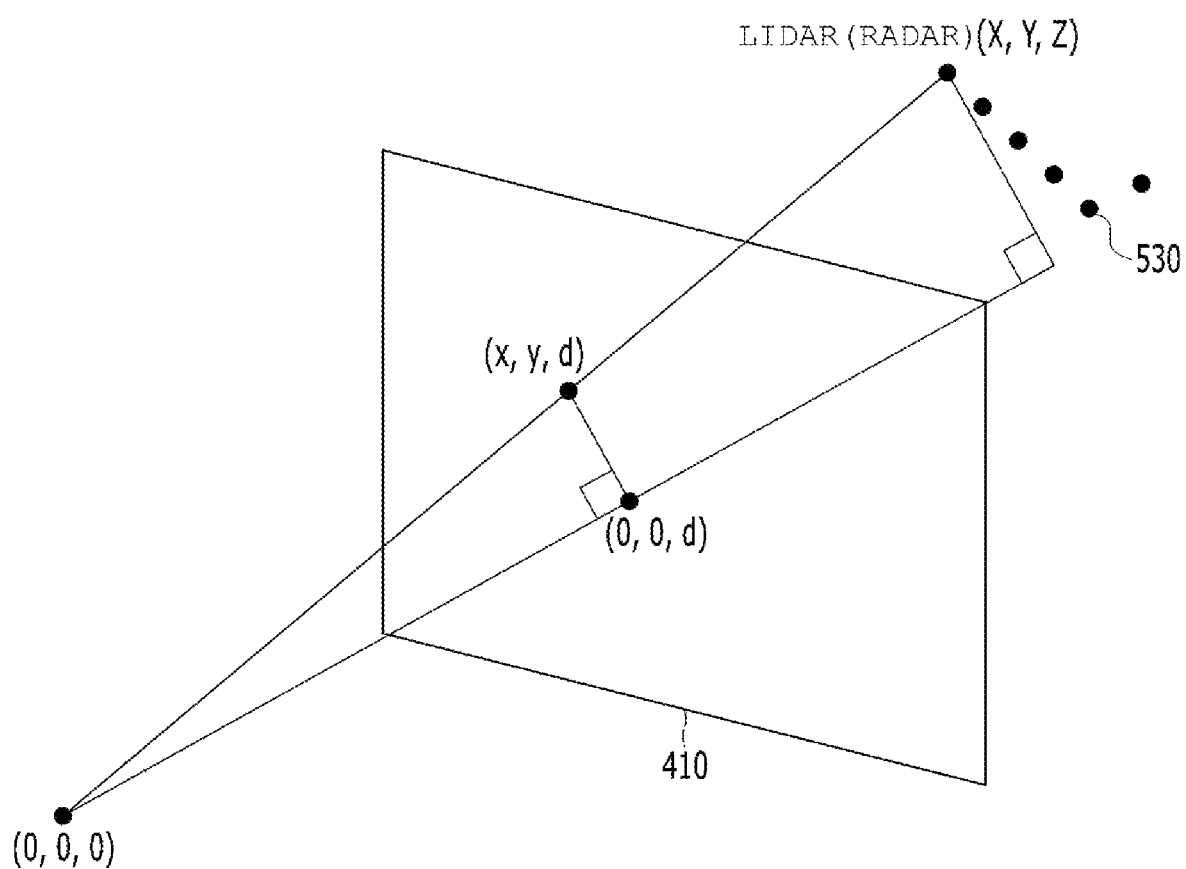
FIG. 3 is a diagram for explaining a procedure of changing coordinates of a detection point to reference coordinates of an image layer.

FIG. 3 is a diagram for explaining a procedure of changing coordinates of a detection point to reference coordinates of an image layer.

Referring to FIG. 3, according to the present disclosure, coordinate information of a detection point 530 included in an object may be converted into a world coordinate system of an image by projecting the coordinate information of the detection point 530 included in the object onto an image layer 410.

For example, according to the present disclosure, the detection point 530 included in information on the object detected using Lidar or Radar may be projected onto the image layer 410, and the coordinates of the detection point 530 may be converted into a world coordinate system of an image through a TransMatrix obtained via calibration between Lidar and a camera or between Radar and a camera.

Here, the converted world coordinate system may calculate coordinates (x, y, z) of a camera using the coordinates (X, Y, Z) of Lidar (Radar) according to the triangle proportionality theorem, as shown in FIG. 3.

$$x = d\frac{X}{Z}, y = d\frac{Y}{Z}$$

(here, d is the specifications of an image sensor)

Figure 4:
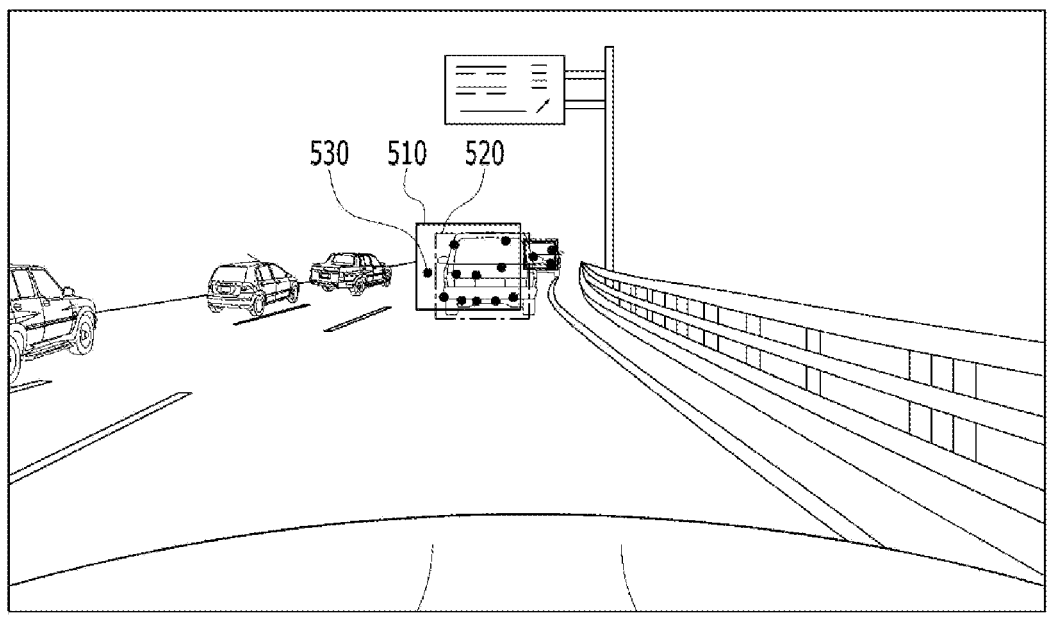
FIG. 4 is a diagram for explaining a procedure of matching a detection point with an object in an image.

FIG. 4 is a diagram for explaining a procedure of matching a detection point with an object in an image.

As shown in FIG. 4, according to the present disclosure, a matching rate between a point cloud of a Lidar (Radar) track and an object in an image may be calculated by comparing a point cloud projected onto an image layer with information on an object detected from an image.

That is, according to the present disclosure, the first box 510, corresponding to the object at the detection point 530 projected onto the image layer, may be generated, the second box 520, corresponding to the object in the image may be generated, and a matching rate may be calculated by comparing the area of the first box 510 with the area of an overlapping region between the first and second boxes 510 and 520.

According to the present disclosure, the first box 510 corresponding to the object at the detection point 530 projected onto the image layer, may be generated, the second box 520, corresponding to the object in the image, may be generated, and the matching rate may be calculated based on the number of detection points 530 included in the second box 520.

Figure 5A:
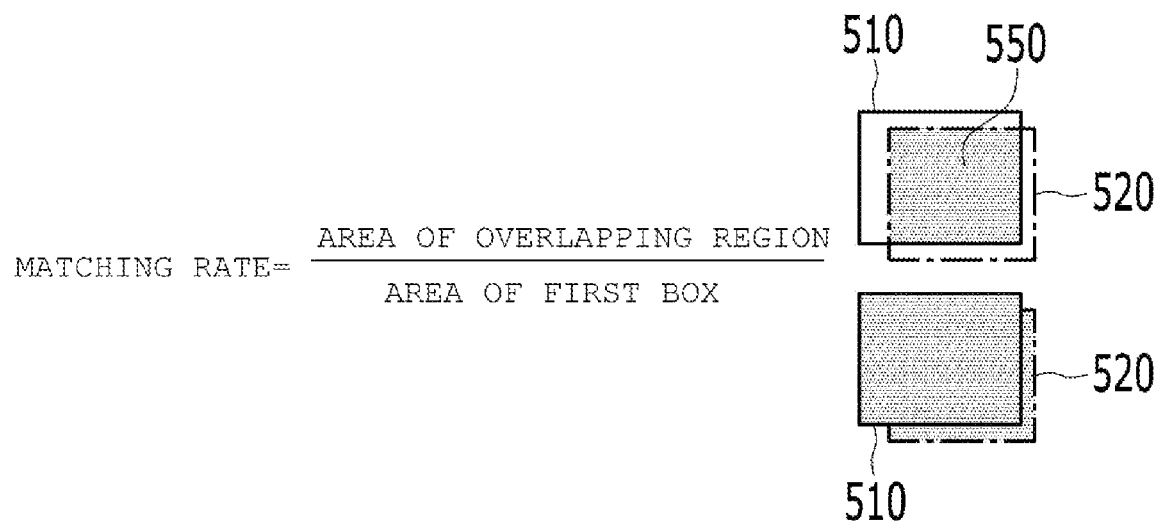
FIGS. 5A and 5B are diagrams for explaining a procedure of calculating a matching rate between information on an object in an image and information on an object detected using Lidar.
Figure 5B:
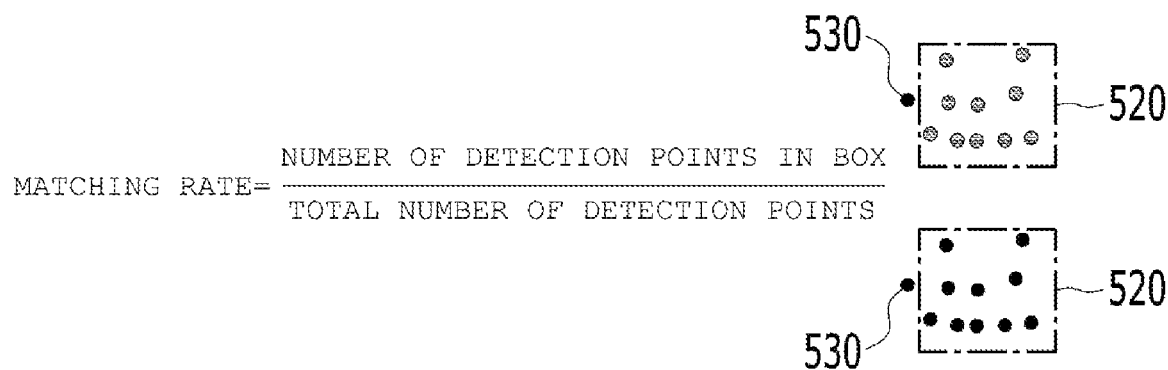

FIGS. 5A and 5B are diagrams for explaining a procedure of calculating a matching rate between information on an object in an image and information on an object detected using Lidar.

As shown in FIGS. 5A and 5B, according to the present disclosure, the matching rate between the information on the object in the image and the information on the projected object detected using Lidar may be calculated, and the target with the highest matching rate may be selected.

According to a first embodiment of the present disclosure, as shown in FIG. 5A, the matching rate may be calculated based on the area of the object detected using Lidar (Radar) on to the image layer and the area of the overlapping region between boxes of the object in the image.

That is, according to the present disclosure, the first box 510 corresponding to the object at the detection point projected onto the image layer may be generated, the second box 520 corresponding to the object in the image may be generated, and the matching rate may be calculated by comparing the area of any one of the first and second boxes 510 and 520 with the area of an overlapping region 550 between the first and second boxes 510 and 520.

For example, the matching rate may be calculated using the equation "Matching rate=area of overlapping region 550 between first and second boxes 510 and 520/area of any one of first and second boxes 510 and 520.

According to a second embodiment, as shown in FIG. 5B, the matching rate may be calculated based on the extent to which the detection point corresponding to an object detected using Lidar (Radar) is included in the box of the object in the image.

That is, according to the present disclosure, the matching rate may be calculated based on the number of detection points 530 corresponding to the object detected using Lidar (Radar) included in the second box 520 corresponding to the object in the image.

For example, according to the present disclosure, the matching rate may be calculated using the equation "Matching rate=number of detection points 530 included in second box 520/total number of detection points 530 projected onto image layer".

Figure 6:
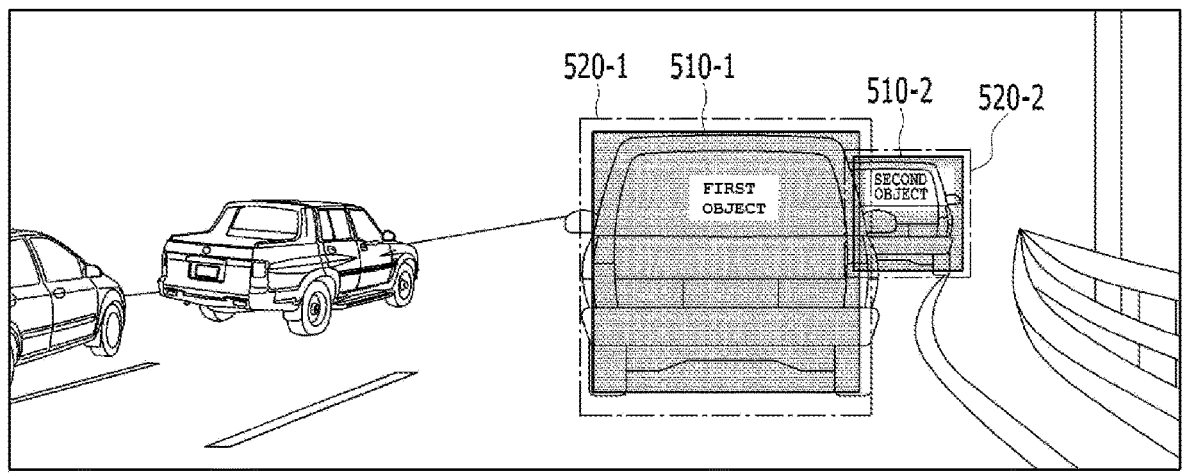
FIG. 6 is a diagram showing matching between first and second object information of an image and first and second object information of Lidar.
Figure 7A:
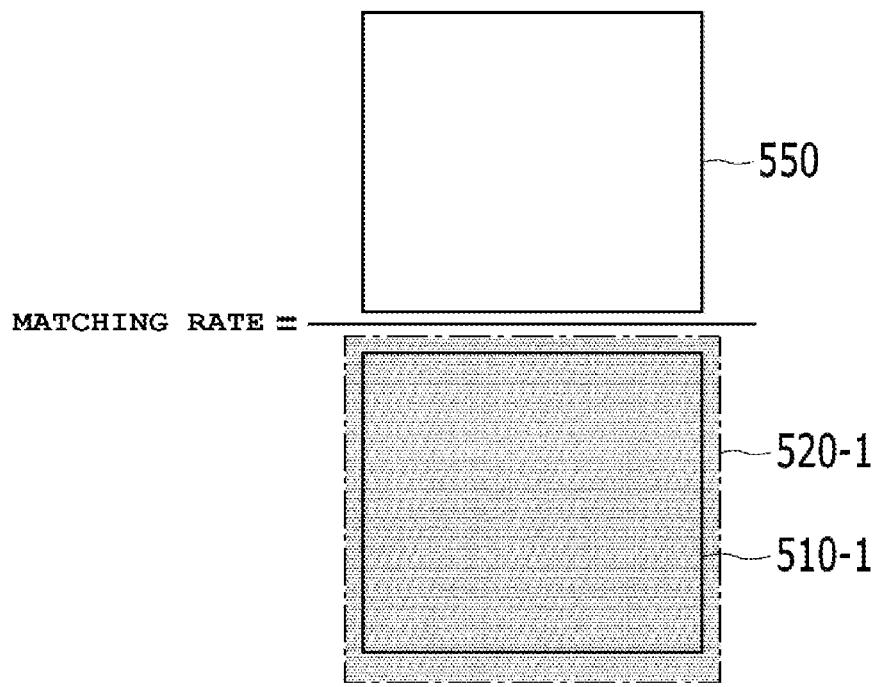
FIGS. 7A and 7B are diagrams for explaining a procedure of calculating a matching rate between first object information of an image and first and second object information of Lidar.
Figure 7B:
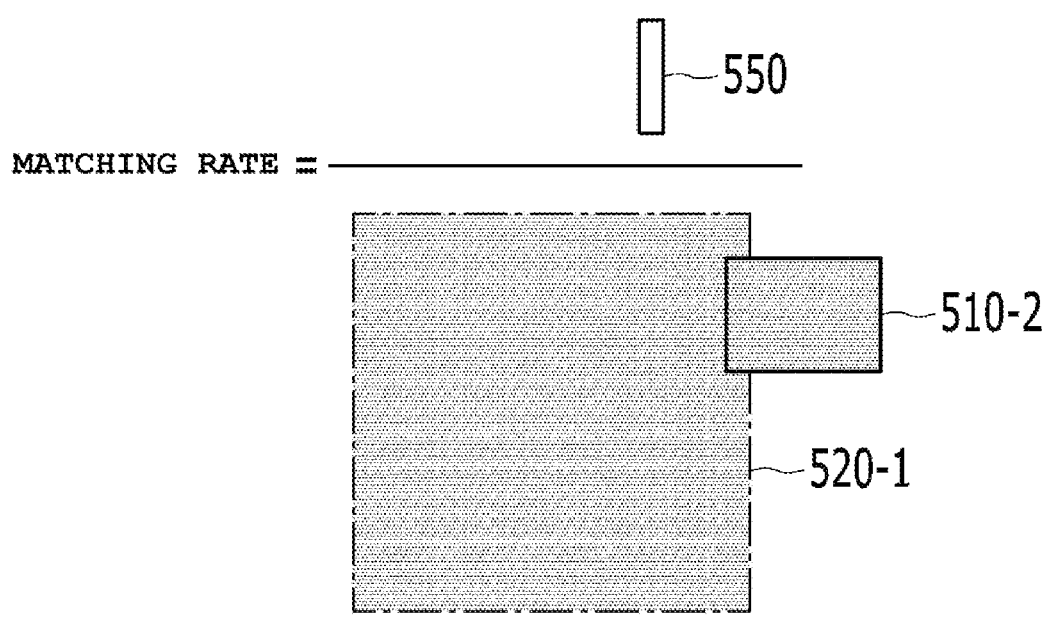

FIG. 6 is a diagram showing matching between first and second object information of an image and first and second object information of Lidar. FIGS. 7A and 7B are diagrams for explaining a procedure of calculating a matching rate between first object information of an image and first and second object information of Lidar.

As shown in FIG. 6, according to the present disclosure, when two objects are present around a vehicle, a first box 510-1 corresponding to a first object detected using Lidar (Radar) and a first box 510-2 corresponding to a second object detected using Lidar (Radar) may be generated, and a second box 520-1 corresponding to a first object in an image and a second box 520-2 corresponding to a second object in the image may be generated.

According to the present disclosure, a matching rate may be calculated by comparing the area of any one of the first and second boxes 510 and 520 with the area of an overlapping region between the first and second boxes 510 and 520, and then, a counterpart object with a high matching rate may be selected as a fusion target object.

As shown in FIGS. 7A and 7B, when a matching rate is calculated based on a second box corresponding to a first object in an image, the matching rate may be calculated by comparing the area of the second box 520 with the area of the overlapping region 550 between the first and second boxes 510 and 520.

That is, the matching rate may be calculated using the equation "Matching rate=area of overlapping region 550 between first and second boxes 510 and 520/area of second box 520".

As shown in FIG. 7A, according to the present disclosure, a matching rate may be calculated by comparing the area of the overlapping region 550 between the first box 510-1 corresponding to the first object and the second box 520-1 corresponding to the first object in FIG. 6.

As shown in FIG. 7B, a matching rate may be calculated by comparing the area of the overlapping region 550 between the first box 510-2 corresponding to the second object and the second box 520-1 corresponding to the first object in FIG. 6.

Then, according to the present disclosure, when a first matching rate between the first object information on the first object in the image and the first object information of the first object detected using Lidar (Radar) is compared with a second matching rate between the first object information of the image and the second object information of the second object detected using Lidar (Radar), if the first matching rate is greater than the second matching rate, the information on the first object in the image and the information of the first object detected using Lidar (Radar) may be recognized to be the same object, and the information on the first object in the image and the information on the second object detected using Lidar (Radar) may be recognized to be different objects.

Figure 8:
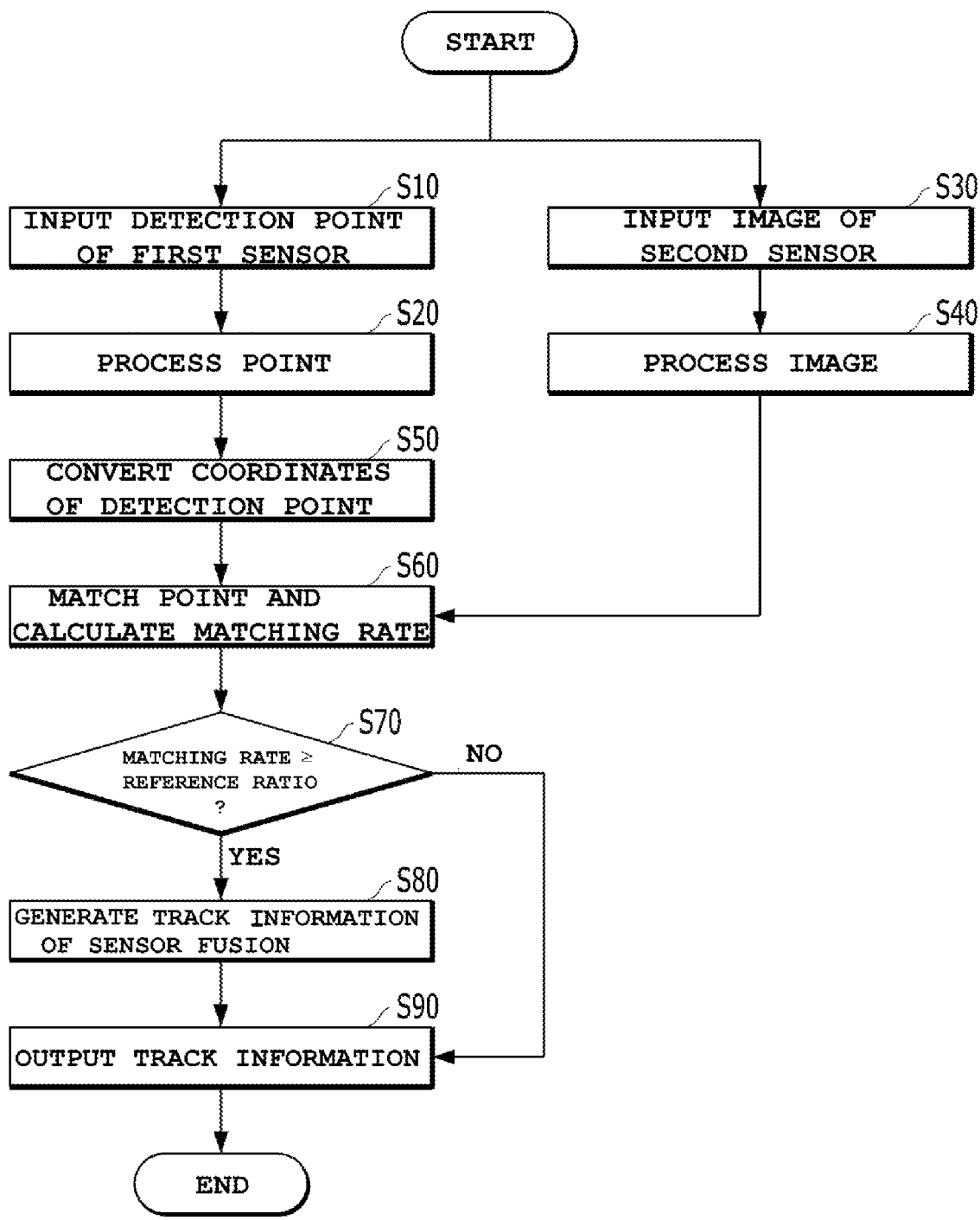
FIG. 8 is a flowchart for explaining a heterogeneous sensor fusion method in one form of the present disclosure.

FIG. 8 is a flowchart for explaining a heterogeneous sensor fusion method according to an embodiment of the present disclosure.

As shown in FIG. 8, according to the present disclosure, a detection point may be input from a first sensor (S10) and an image may be received from a second sensor (S30).

For example, the first sensor 100 may include at least one of Lidar or Radar, and the second sensor 200 may include a camera, but the present disclosure is not limited thereto.

Then, according to the present disclosure, an object may be detected by processing the detection point input from the first sensor (S20), and coordinate information of a detection point of the object may be converted into a world coordinate system of an image by projecting the coordinate information of the detection point of the object onto an image layer (S50).

Here, according to the present disclosure, when the detection point is received from the first sensor, the object may be detected and classified based on the detection point, and the coordinate information of the detection point of the detected object may be stored.

According to the present disclosure, the object may be detected by processing an image received from the second sensor (S40).

Here, according to the present disclosure, when an image is received from the second sensor, an object may be detected and classified from the image, and coordinate information of an image pixel included in the detected object may be stored.

Then, according to the present disclosure, the matching rate may be calculated by matching the detection point with the object in the image (S60).

Here, according to the present disclosure, a first box, corresponding to an object at a detection point projected onto an image layer, may be generated, a second box corresponding to an object in an image may be generated, and a matching rate may be calculated by comparing the area of the first box with the area of the overlapping region between the first and second boxes.

For example, the matching rate may be calculated using the equation "Matching rate=area of overlapping region between first and second boxes/area of first box".

As necessary, according to the present disclosure, a first box corresponding to an object at a detection point projected onto an image layer may be generated, a second box corresponding to an object in an image may be generated, and a matching rate may be calculated based on the number of detection points included in the second box.

For example, the matching rate may be calculated using the equation "Matching rate=number of detection points included in second box/total number of detection points projected onto image layer".

Then, according to the present disclosure, whether the calculated matching rate is equal to or greater than a reference ratio may be checked (S70).

Here, according to the present disclosure, when the matching rate is equal to or greater than the reference ratio, the object in the image and the object corresponding to the detection point may be recognized to be the same object, and when the matching rate is less than the reference ratio, the object in the image and the object at the detection point may be recognized to be different objects.

Then, according to the present disclosure, when the object in the image and the object at the detection point are the same object, track information may be generated by fusing information from the first and second sensors (S80).

According to the present disclosure, the generated track information may be output (S90).

Here, according to the present disclosure, when the object in the image and the object at the detection point are not the same object, information from the first and second sensors may be output separately.

As such, according to the present disclosure, the matching rate may be calculated by matching the detection point of the first sensor with the object in the image of the second sensor, and the information from the first and second sensors may be fused based on the matching rate, and thus the performance of fusion of heterogeneous sensors may be improved, thereby improving the accuracy of track information.

According to the present disclosure, as a sensor fusion method for improving the performance of fusion of an image sensor and a Lidar sensor (high-performance Radar), which have raw data having similar characteristics, coordinates of a point cloud may be changed to reference coordinates of the image layer, and the point cloud with the changed coordinate may be compared with a pixel of the image, thereby improving the performance for determining whether detected objects are the same object.

As such, the present disclosure may convert data in a simple manner and may improve the performance of sensor fusion using a fusion application method between heterogeneous sensors having raw data with similar characteristics.

The present disclosure may improve the performance of sensor fusion without an additional increase in material costs by implementing logic in software.

According to the present disclosure, a computer-readable recording medium having recorded thereon a program for executing a heterogeneous sensor fusion method of a heterogeneous sensor fusion apparatus may perform the heterogeneous sensor fusion method of the heterogeneous sensor fusion apparatus according to embodiments of the present disclosure.

The apparatus and method for performing heterogeneous sensor fusion related to at least one embodiment of the present disclosure as configured above may calculate a matching rate by matching a detection point of a first sensor with an object in an image of a second sensor and may fuse information from the first and second sensors based on the matching rate, and thus may improve the performance for fusion of heterogeneous sensors, thereby improving the accuracy of track information.

According to the present disclosure, as a sensor fusion method for improving the performance of fusion of an image sensor and a Lidar sensor (high-performance Radar), which have raw data having similar characteristics, the coordinates of a point cloud may be changed to reference coordinates of the image layer, and the point cloud having the changed coordinates may be compared with a pixel of the image, thereby improving the performance for determining whether detected objects are the same object.

As such, the present disclosure may simply convert data and may improve the performance of sensor fusion using a fusion application method between heterogeneous sensors having raw data with similar characteristics.

The present disclosure may improve the performance of sensor fusion without an additional increase in material costs by implementing logic in software.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer-readable code stored on a computer-readable recording medium. The computer-readable recording medium is any data storage device that can store data which can thereafter be read by a computer. Examples of the computer-readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the embodiments. Thus, it is intended that the present disclosure cover the modifications and variations of the embodiment provided they come within the scope of the appended claims and their equivalents.

What is claimed is:

1. A heterogeneous sensor fusion apparatus, comprising:
   a point processor configured to detect a first object by processing detection points input from at least one of a lidar or a radar corresponding to a first sensor;
   an image processor configured to detect a second object by processing an image input from a camera corresponding to a second sensor;
   a point-matching unit configured to:
      obtain converted coordinates of the detection points by converting coordinates of the detection points in a first coordinate system of the first sensor into coordinates in a second coordinate system of the second sensor using a trans-matrix obtained via a calibration between the first coordinate system and the second coordinate system;
      calculate a matching rate by matching the detection points of the converted coordinates with the second object of the image; and
      determine whether the second object and the first object are identical based on the calculated matching rate;
   an association unit configured to generate track information by fusing information from the first sensor and the second sensor when it is determined that the first object and the second object are identical; and
   an output unit configured to output the track information,
   wherein the point-matching unit is further configured to:
      generate a first box corresponding to the first object projected onto an image layer and a second box corresponding to the second object and calculate a value of the matching rate of an area of an overlapping region between the first box and the second box to an area of the first box or the second box, or
      generate a first box corresponding to the first object projected onto an image layer and a second box corresponding to the second object and calculate a value of the matching rate of a number of detection points included in the second box to a total number of the whole detection points.

2. The apparatus of claim 1, wherein the point processor is configured to detect and classify the first object based on the detection points.

3. The apparatus of claim 1, wherein the point processor is configured to store coordinate information of the detection points included in the first object.

4. The apparatus of claim 1, wherein the image processor is configured to detect and classify the second object based on the image.

5. The apparatus of claim 1, wherein the image processor is configured to store coordinate information of an image pixel included in the second object.

6. The apparatus of claim 1, wherein the point-matching unit is configured to:
   generate the first box corresponding to the first object projected onto an image layer;
   generate the second box corresponding to the second object; and
   calculate the matching rate by comparing an area of the first box or the second box with an area of an overlapping region between the first box and the second box.

7. The apparatus of claim 1, wherein the point-matching unit is configured to:
   generate the first box corresponding to the first object projected onto an image layer;
   generate the second box corresponding to the second object; and
   calculate the matching rate based on a number of detection points included in the second box.

8. The apparatus of claim 1, wherein, when it is determined that the first object and the second object are identical, the point-matching unit is configured to:
   determine whether the matching rate is equal to or greater than a reference ratio;
   when it is determined that the matching rate is equal to or greater than the reference ratio, recognize that the first object and the second object are identical; and
   transmit the information from the first sensor and the second sensor to the association unit to fuse the information.

9. The apparatus of claim 1, wherein the output unit is configured to:
   output the track information; and
   separately output the information from the first sensor and the second sensor when the first object and the second object are not identical.

10. A method comprising:
   detecting a first object by processing detection points input from at least one of a lidar or a radar corresponding to a first sensor;
   detecting a second object by processing an image input from a camera corresponding to a second sensor;
   obtaining converted coordinates of the detection points by converting coordinates of the detection points in a first coordinate system of the first sensor into coordinates in a second coordinate system of the second sensor using a trans-matrix obtained via a calibration between the first coordinate system and the second coordinate system;
   calculating a matching rate by matching the detection points of the converted coordinates with the second object of the image;
   determining whether the first object and the second object are identical based on the calculated matching rate;
   generating track information by fusing information from the first sensor and the second sensor when the first object and the second object are identical; and outputting the track information,
wherein the calculating the matching rate comprises:
generating a first box corresponding to the first object projected onto an image layer, generating a second box corresponding to the second object, and calculating a value of the matching rate of an area of an overlapping region between the first box and the second box to an area of the first box or the second box, or
generating a first box corresponding to the first object projected onto an image layer, generating a second box corresponding to the second object, and calculating a value of the matching rate of a number of detection points included in the second box to a total number of the whole detection points.

11. The method of claim 10, wherein detecting the first object comprises detecting and classifying the first object based on the detection points, and storing coordinate information of detection points included in the first object.

12. The method of claim 10, wherein detecting the second object comprises detecting and classifying the second object based on the image, and storing coordinate information of an image pixel included in the second object.

13. The method of claim 10, wherein calculating the matching rate comprises:
generating the first box corresponding to the first object projected onto an image layer;
generating the second box corresponding to the second object; and
calculating the matching rate by comparing an area of the first box or the second box with an area of an overlapping region between the first box and the second box.

14. The method of claim 10, wherein calculating the matching rate comprises:
generating the first box corresponding to the first object projected onto an image layer;
generating the second box corresponding to the second object; and
calculating the matching rate based on a number of detection points included in the second box.

15. The method of claim 10, wherein determining whether the first object and the second object are identical comprises:
determining whether the matching rate is equal to or greater than a reference ratio; and
recognizing that the first object and the second object are identical when it is determined that the matching rate is equal to or greater than the reference ratio.

16. The method of claim 10, wherein it is determined that the first object and the second object are not identical and wherein outputting the generated track information comprises separately outputting the information from the first sensor and the second sensor.

17. A non-transitory computer-readable recording medium having a program recorded thereon, the program to direct a processor to perform acts of:
detecting a first object by processing detection points input from at least one of a lidar or a radar corresponding to a first sensor;
detecting a second object by processing an image input from a camera corresponding to a second sensor;
obtaining converted coordinates of the detection points by converting coordinates of the detection points in a first coordinate system of the first sensor into coordinates in a second coordinate system of the second sensor using a trans-matrix obtained via a calibration between the first coordinate system and the second coordinate system;
calculating a matching rate by matching the detection points of the converted coordinates with the second object of the image;
determining whether the first object and the second object are identical based on the calculated matching rate;
generating track information by fusing information from the first sensor and the second sensor when the first object and the second object are identical; and
outputting the track information,
wherein the calculating the matching rate comprises:
generating a first box corresponding to the first object projected onto an image layer, generating a second box corresponding to the second object, and calculating a value of the matching rate of an area of an overlapping region between the first box and the second box to an area of the first box or the second box, or
generating a first box corresponding to the first object projected onto an image layer, generating a second box corresponding to the second object, and calculating a value of the matching rate of a number of detection points included in the second box to a total number of the whole detection points.

18. A vehicle comprising:
a first sensor configured to acquire detection points corresponding to a first object around the vehicle, the detection points being input from at least one of a lidar or a radar corresponding to the first sensor;
a camera corresponding to a second sensor configured to acquire an image of a region around the vehicle; and
a heterogeneous sensor fusion apparatus configured to fuse information from the first sensor and the second sensor,
wherein the heterogeneous sensor fusion apparatus is further configured to:
detect the first object by processing detection points input from the first sensor;
detect a second object by processing an image input from the second sensor;
obtaining converted coordinates of the detection points by converting coordinates of the detection points in a first coordinate system of the first sensor into coordinates in a second coordinate system of the second sensor using a trans-matrix obtained via a calibration between the first coordinate system and the second coordinate system;
calculate a matching rate by matching the detection points of the converted coordinates with the second object of the image;
determine whether the first object and the second object are identical based on the calculated matching rate;
generate track information by fusing the information from the first sensor and the second sensor when it is determined that the first object and the second object are identical; and
output the generated track information,
wherein the heterogeneous sensor fusion apparatus is further configured to:
generate a first box corresponding to the first object projected onto an image layer, generate a second box corresponding to the second object, and calculate a value of the matching rate of an area of an overlapping region between the first box and the second box to an area of the first box or the second box, or
generate a first box corresponding to the first object projected onto an image layer, generate a second box corresponding to the second object, and calculate a value of the matching rate of a number of detection points included in the second box to a total number of the whole detection points.

19. The computer-readable recording medium of claim 17, wherein calculating the matching rate comprises:
generating the first box corresponding to the first object projected onto an image layer;
generating the second box corresponding to the second object; and
calculating the matching rate by comparing an area of the first box or the second box with an area of an overlapping region between the first box and the second box.

20. The computer-readable recording medium of claim 17, wherein calculating the matching rate comprises:
generating the first box corresponding to the first object projected onto an image layer;
generating the second box corresponding to the second object; and
calculating the matching rate based on a number of detection points included in the second box.

\* \* \* \* \*